United States Patent [19]

Mandel

[11] Patent Number: 5,292,045
[45] Date of Patent: Mar. 8, 1994

[54] MULTIPURPOSE RACK FOR CONVERTIBLE TOP MOTOR VEHICLES

[76] Inventor: F. Howard Mandel, 1597 Westdale, South Euclid, Ohio 44121

[21] Appl. No.: 923,098

[22] Filed: Jul. 30, 1992

[51] Int. Cl.5 .............................................. B60R 9/08
[52] U.S. Cl. .................................... 224/309; 224/321; 224/329
[58] Field of Search ................. 224/42.03 B, 309, 310, 224/314, 321, 322, 329, 331, 29.5, 42.03 R, 42.07, 42.08, 42.11, 281, 282, 317, 319, 323, 325, 917

[56] References Cited

U.S. PATENT DOCUMENTS

| | | | |
|---|---|---|---|
| 2,247,128 | 6/1941 | Levey | 224/42.03 R |
| 2,537,587 | 1/1951 | Humphrey | 224/329 |
| 3,349,977 | 10/1967 | Caminiti | 224/321 |
| 3,709,413 | 1/1973 | Nelson | 224/329 |
| 3,712,524 | 1/1973 | Ames, Sr. | 224/310 |
| 3,792,805 | 2/1974 | Binding et al. | 224/321 |
| 3,918,669 | 11/1975 | Osterhout | 224/309 |
| 4,007,862 | 2/1977 | Heftmann | 224/42.1 B |
| 4,168,023 | 9/1979 | Osborn | 224/325 |
| 4,345,705 | 8/1982 | Graber | 224/42.03 B |
| 4,406,384 | 9/1983 | Shantz | 224/42.08 |
| 4,452,385 | 6/1984 | Prosen | 224/321 |
| 4,527,827 | 7/1985 | Maniscalco | 296/3 |
| 4,531,879 | 7/1985 | Horowitz | 224/331 |
| 4,538,752 | 9/1985 | Welter | 224/309 |
| 4,603,798 | 8/1986 | Griswold | 224/310 |
| 4,630,990 | 12/1986 | Whiting | 224/310 |
| 4,733,810 | 3/1988 | Graber et al. | 224/321 |
| 4,795,178 | 1/1989 | Nabaraete | 280/47.13 |
| 4,867,362 | 9/1989 | Finnegan | 224/319 |

FOREIGN PATENT DOCUMENTS

| | | | |
|---|---|---|---|
| 3520132 | 12/1986 | Fed. Rep. of Germany | 224/325 |
| 3915359 | 11/1990 | Fed. Rep. of Germany | 224/325 |
| 4-039141 | 2/1992 | Japan | 224/325 |

OTHER PUBLICATIONS

Side rack by Windsurfing Express (date unknown).

Primary Examiner—Renee S. Luebke

[57] ABSTRACT

A detachable car rack for carrying items such as sailboards, bicycles, surfboards, skis, or the like, particularly for cars with convertible tops, regardless of whether the convertible top is "up" or "down." The invention includes a front support attached to the windshield or surrounding supports, hood, or surfaces of the vehicle's body, a rear support attached to the trunk lid or aft bumper or surfaces of the vehicle's body, and an elevated, horizontal, longitudinal assembly anchored to the front and rear supports which is used to carry the load.

5 Claims, 6 Drawing Sheets

MULTIPURPOSE RACK FOR CONVERTIBLE TOP MOTOR VEHICLES

BACKGROUND

This invention relates to car racks for carrying items such as sailboards, bicycles, surfboards, skis, or the like, particularly for cars with convertible tops.

Many persons who own convertible top vehicles also enjoy wind surfing, biking, surfing, water skiing, snow skiing, and other similar sports that require the transportation of equipment, typically on a "roof rack." There are numerous carriers of this nature which are fastened to hard top roofs and hard top rain gutters by various combinations of clamps, clips, straps, pads, magnetic devices, and suction cups. None of these devices, however, can be secured to convertible tops. Moreover, none of these devices can be used if the vehicle does not have a top or if its convertible top is "down," as shown, for example, in U.S. Pat. No. 4,867,362 to Finnegan; U.S. Pat. No. 4,795,178 to Nabarrete; and U.S. Pat. No. 4,007,862 to Heftmann.

A few attempts to address similar problems have been made. For example, U.S. Pat. No. 4,538,752 to Welter discloses a clamp device for carrying a canoe on a convertible top jeep. This device requires a rear roll bar capable of weight bearing. Very few, if any, convertible top vehicles have such a roll bar other than jeeps. Similarly, U.S. Pat. No. 4,527,827 to Maniscalco, discloses an invention for supporting a surf board above the bed of a pickup truck. This device could not be used with convertible top vehicles as it depends on the cab roof and the vertical bed sides for attachment and weight bearing.

Additionally, there is an invention designed for carrying sailboards along the side of a vehicle. It is comprised of one tube bent to contain two large S-hooks, spaced a few feet apart. The top hook of each S is placed over the top of a car door while the bottom hook of each S cradles the board. This device can never be used with the door window closed and, in some cases, it cannot be used with the convertible top "up"; thus, the possibility of inclement weather makes this device impractical in many regions. Moreover, the car door supporting this device cannot be opened when a sailboard is being carried. Finally, this device is not capable of carrying anything except one sailboard: it cannot carry bicycles or two sailboards.

SUMMARY OF INVENTION

The rack (as more fully described below) consists of the following:

(a) a front assembly comprised of (1) a spreader bar perpendicular to the direction of the vehicle anchored to the windshield of the vehicle via two vacuum cups and (2) a short front connection means attached to the middle of the spreader bar;

(b) a rear assembly comprised of (1) a base bar resting perpendicular to the direction of the vehicle on pads and anchored to the trunk lid via straps and clips and (2) two support bars of even length anchored near the ends of the base bar and angled forward and upward to a common point; and (c) a longitudinal assembly comprised of (1) two bars connected end-to-end to form an elongated bar braced above the vehicle between the rear support bars of the rear assembly and the front connection means of the front assembly and (2) laterally-attached bars used to support the equipment.

The longitudinal assembly is connected to the front and rear assemblies. The rack is affixed to the vehicle, first, by sliding the vacuum cups on the spreader bar so that they are outside of the vehicle's windshield wiper pattern and tilted so that they are flush against the curve of the windshield prior to creating the vacuum. Second, the rear assembly is placed on the trunk of the vehicle and its straps and clips are then adjusted and attached to the hinge and open edges of the trunk. The front connection means and the rear support bars are angled upward and toward the center of the vehicle to a height so as to permit the longitudinal assembly (when attached to the front and rear assemblies) to be both parallel to the ground and slightly higher than the highest part of the vehicle (including in the case of convertible top vehicles, the highest peak of the roof assuming the roof is up, i.e. closed).

To raise or lower a convertible top, the longitudinal assembly is detached from the front assembly (or the front assembly is removed from the vehicle) and swiveled up enough to allow the convertible top to swing by prior to re-attaching the longitudinal assembly to the front assembly (or the front assembly to the vehicle).

Accordingly, it is an object of the present invention to provide a multipurpose rack which can be used to carry sailboards, bicycles, surf boards, skis, and other items on a convertible top (or no top) vehicle; a rack which can be used regardless of whether the convertible top is "up" or "down"; a rack which can be used on virtually all U.S. and foreign-made cars, convertible top or hard top, and is not dependent on features inherent to specific models (such as roll bars or other unusual weight bearing structures); and a rack which can be used without prohibiting the use of normal car functions, such as opening and closing the car's windows, doors, and convertible top.

Further objects and advantages of the present invention will become apparent from a consideration of the drawings, thus appended claims and ensuing detailed description.

DETAILED DESCRIPTION

Figure 1:
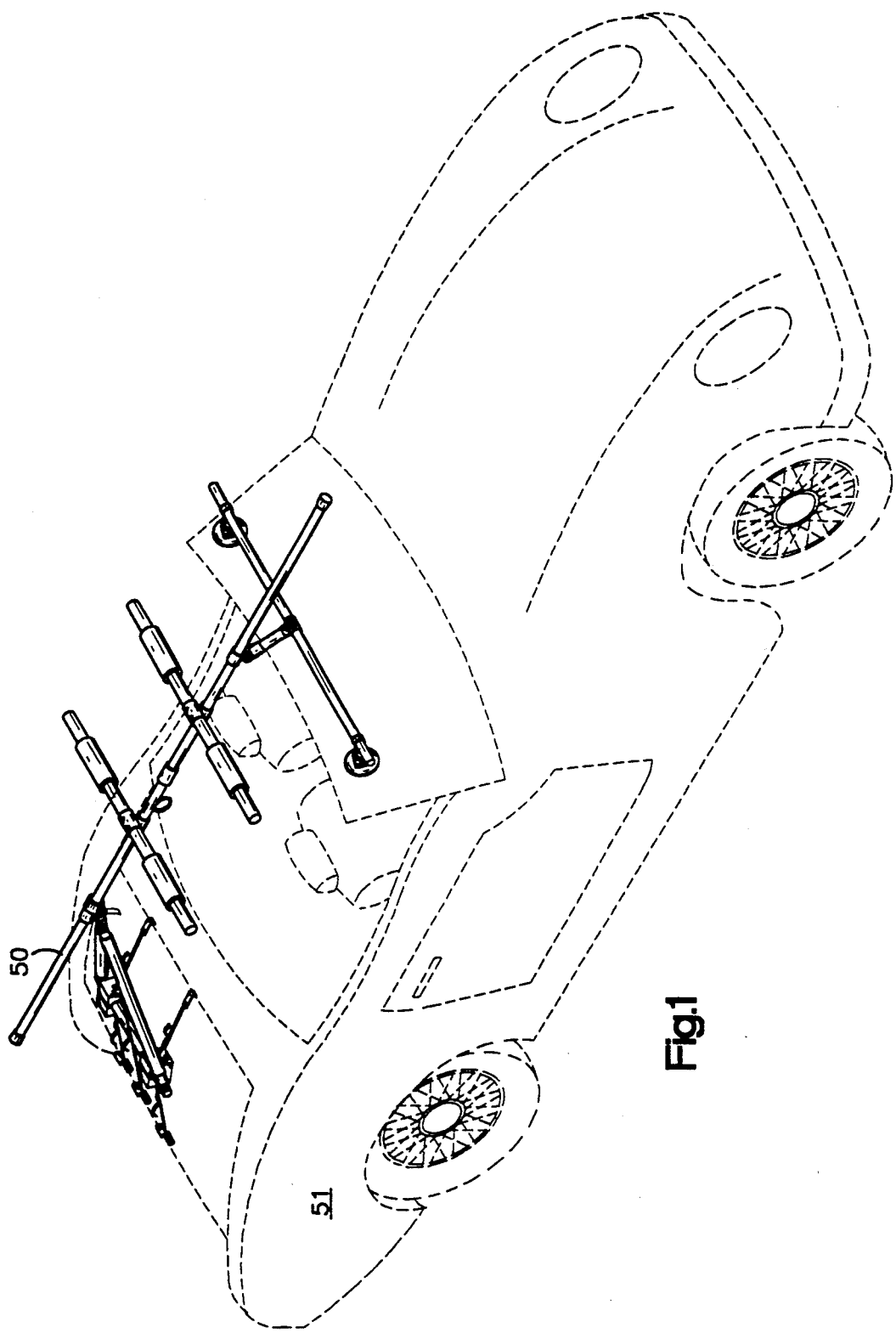
FIG. 1 is a perspective view of the present invention as installed on a car.
Figure 2:
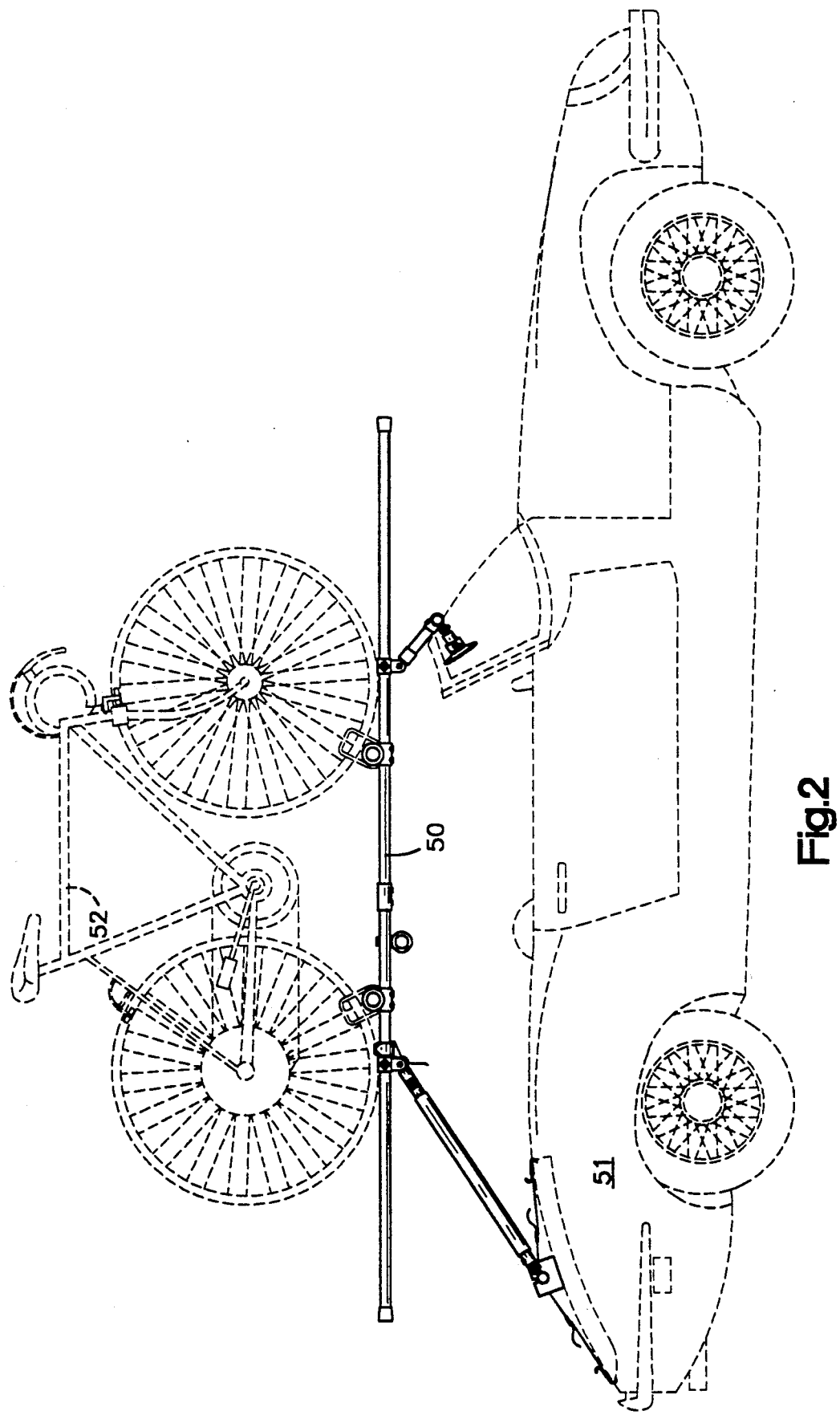
FIG. 2 is a side elevational view of the rack of FIG. 1 as installed on a car and supporting a bicycle.

FIG. 1 and FIG. 2 depict the rack 50 as mounted on a convertible top vehicle 51 and supporting a bicycle 52.

Figure 3:
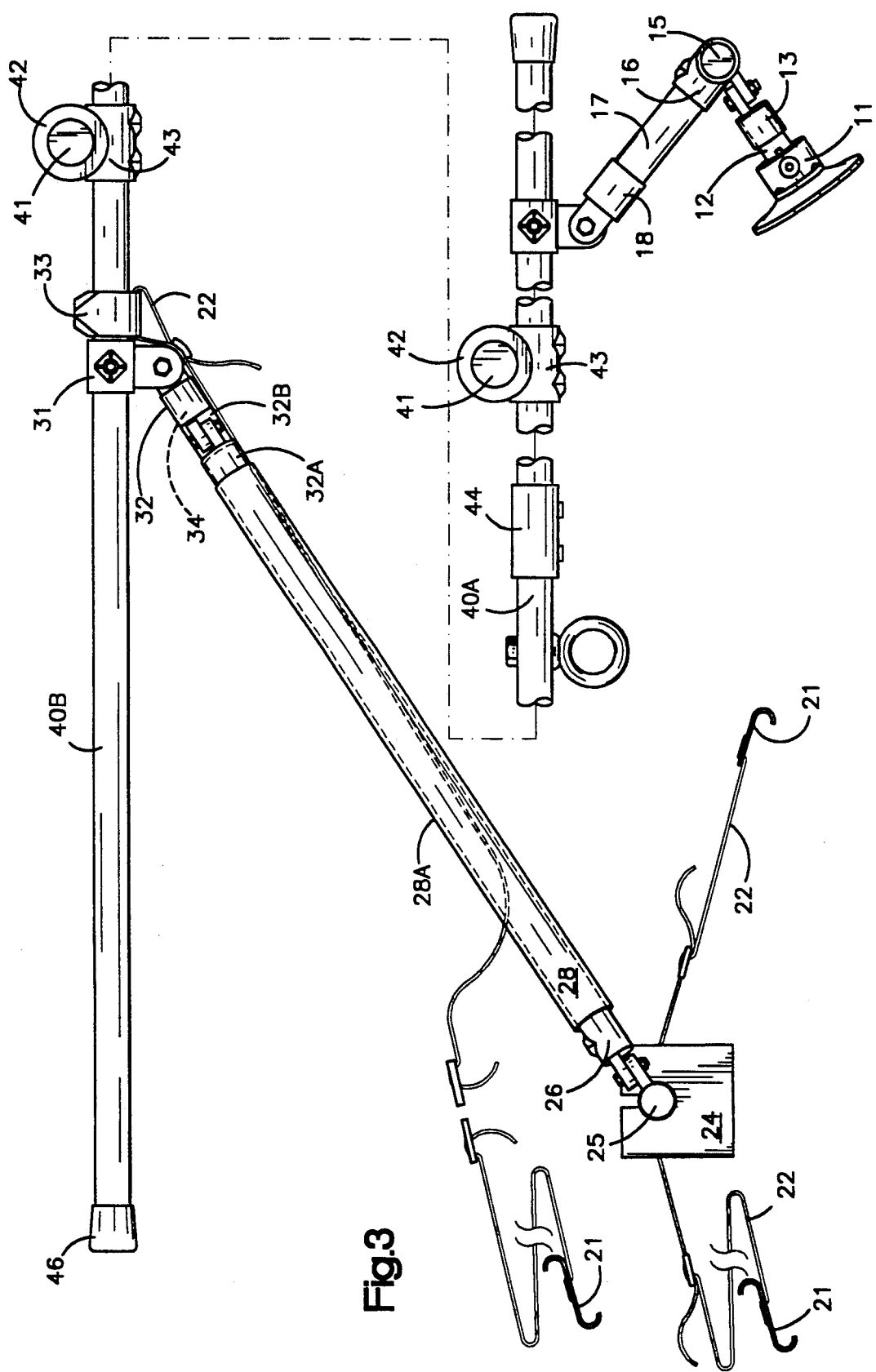
FIG. 3 is an enlarged, side elevational view of the rack of FIG. 1.
Figure 4:
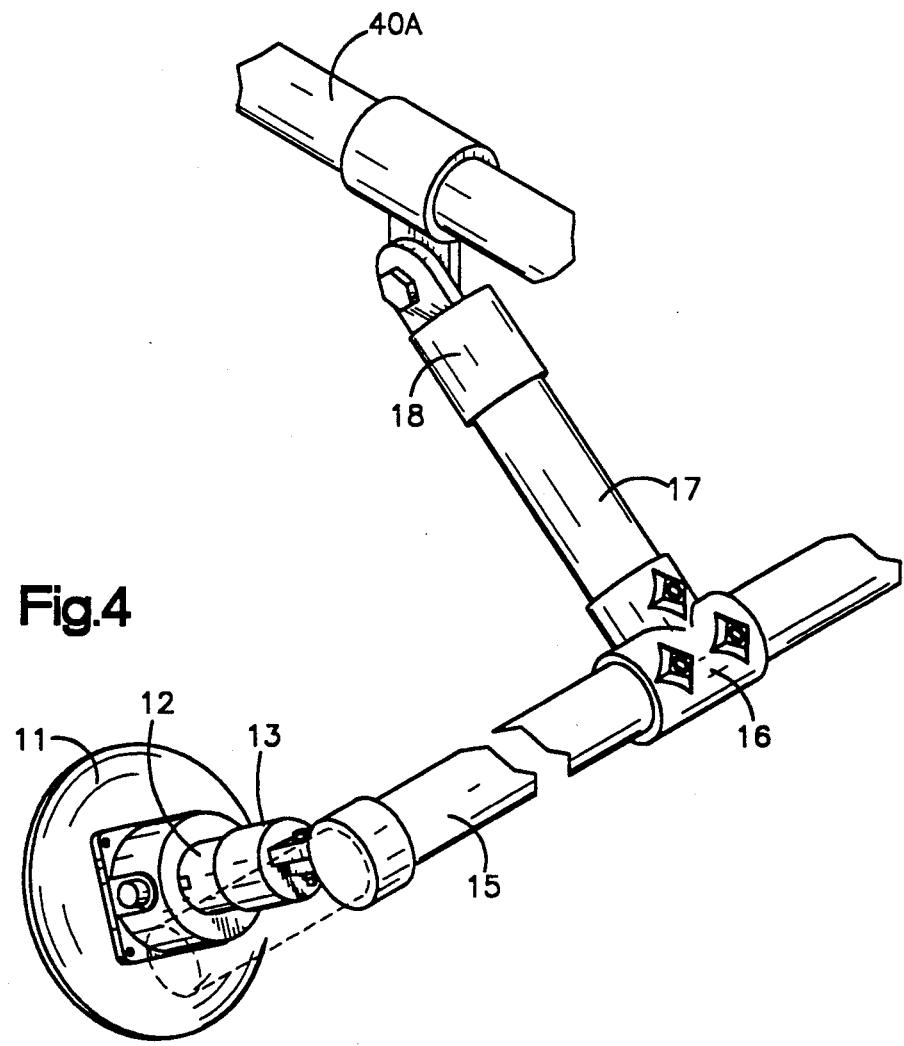
FIG. 4 is an enlarged, perspective view of the front support means portion of the rack of FIG. 1.

FIG. 3 and FIG. 4 depict, in greater detail, the preferred embodiments for the front assembly of the rack. The front assembly of the rack is comprised of vacuum cups 11, which can be purchased fully manufactured with a bolt protruding as an attachment mechanism, such as Woods' Powr-Grip Co., Inc. (Laurel, Mont.) 4.5" or 6" accessory mount vacuum cups. The vacuum cups are attached to the windshield of the vehicle 51 as depicted in FIG. 1 and FIG. 2. A steel extension stud 12 is screwed on to the bolt and attached to the aluminum adjustable tee fitting 23.

Adjustable tee fitting 13, like all fittings in the rack, can be purchased fully manufactured, complete With set screws for attachment to tubular aluminum parts at the desired angles. In addition, all of the fittings, such as 13, that are comprised of movable parts can be purchased fully manufactured, complete with pre-drilled holes and a bolt and nut assembly which can be tightened at the desired angles. All of the aluminum fittings in the rack, such as 13, can be purchased from Diamond Aluminum Company (Cincinnati, Ohio), as well as other sources.

Adjustable tee fitting 13 is attached to aluminum bar 15. Aluminum joining tee fitting 16 is attached to bar 15 and the short aluminum bar 17. Aluminum adjustable tee fitting 18 connects bar 17 to aluminum bar 40A.

Figure 5:
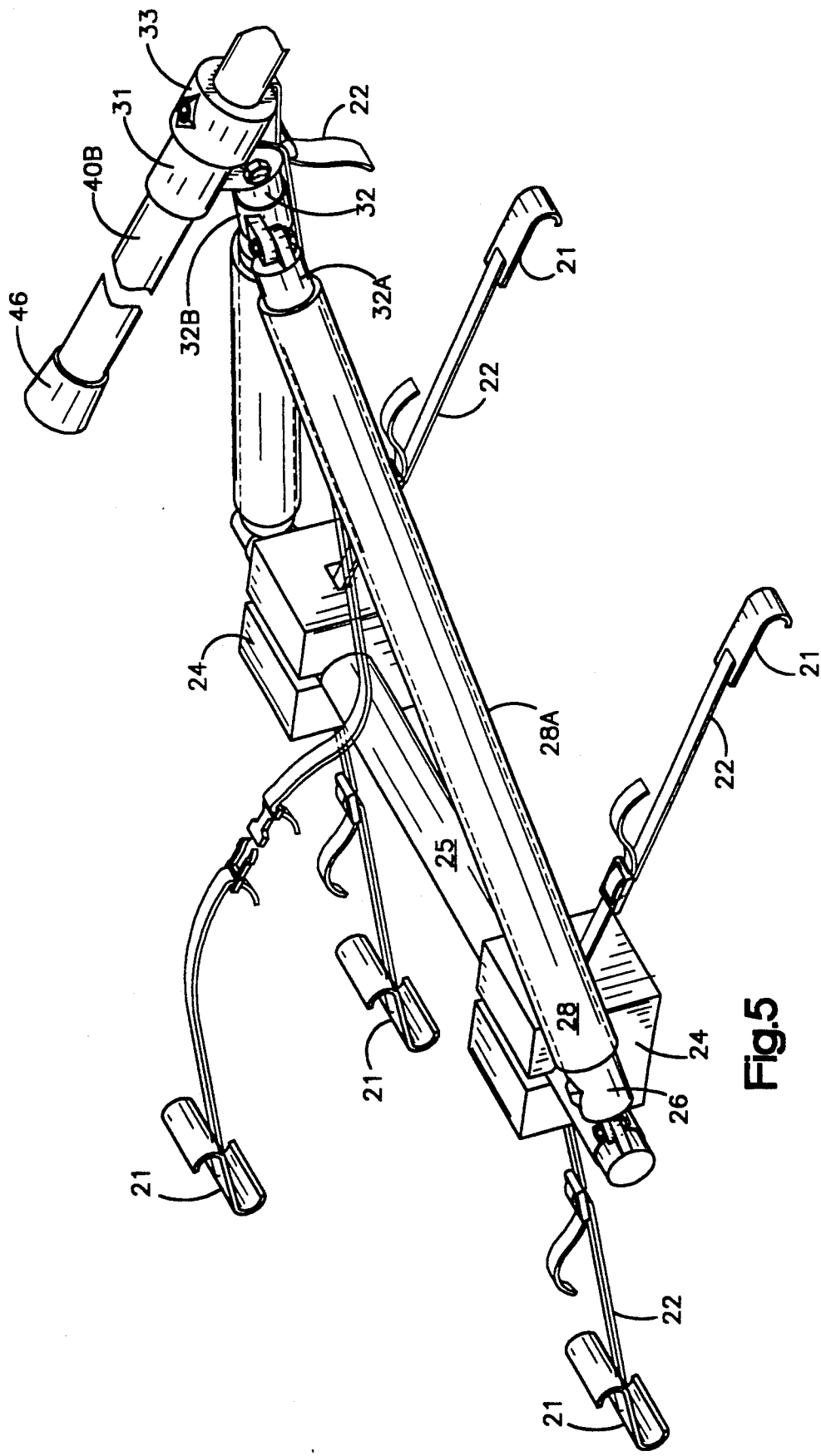
FIG. 5 is an enlarged, perspective view of the rear support means portion of the rack of FIG. 1.

FIG. 3 and FIG. 5 depict, in greater detail, the preferred embodiments for the rear assembly of the rack. The rear assembly of the rack is comprised of steel clips 21 coated with rubber attached to nylon strap mechanisms 22, which can be purchased fully manufactured with plastic adjustment catches. The clips 21 are attached to the trunk lid of the vehicle 51 as depicted in FIG. 1 and FIG. 2. The straps 22 are wrapped around aluminum bar 25 and threaded through slits cut into foam blocks 24 which can be purchased fully manufactured from Graber Products (Madison, Wis.) with a pre-drilled tunnel for bar 25. Bar 25 rests inside foam blocks 24. Aluminum bars 28, which can be covered with spongy material 28A, is attached to bar 25 with aluminum adjustable tee fittings 26. Bars 28 are capped with socket swivel fittings 32A which are attached to aluminum double swivel fitting 32B. The socket swivel fittings 32A and double swivel fitting 32B comprise fitting 32. Fitting 32 is fitted over and attached to a short aluminum bar 34. Aluminum adjustable tee fitting 31 is fitted over bar 34 and attached to aluminum bar 40B.

Collar fitting 33 is attached to bar 40B and connects a strap 22 to a clip 21.

Figure 7:
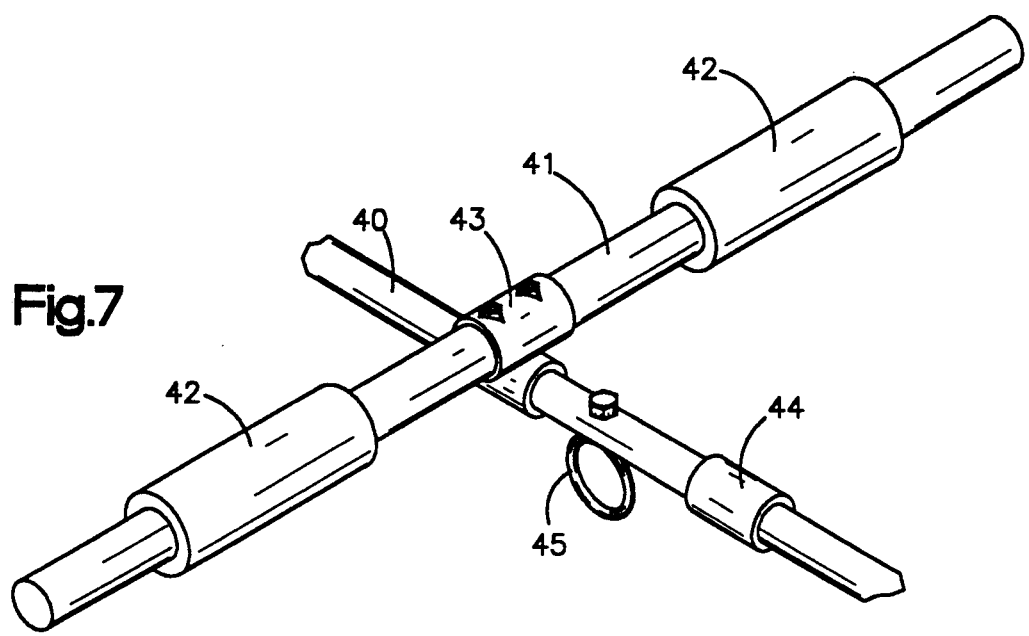
FIG. 7 is an enlarged, perspective view of the equipment support portion of the rack of FIG. 1.
Figure 6:
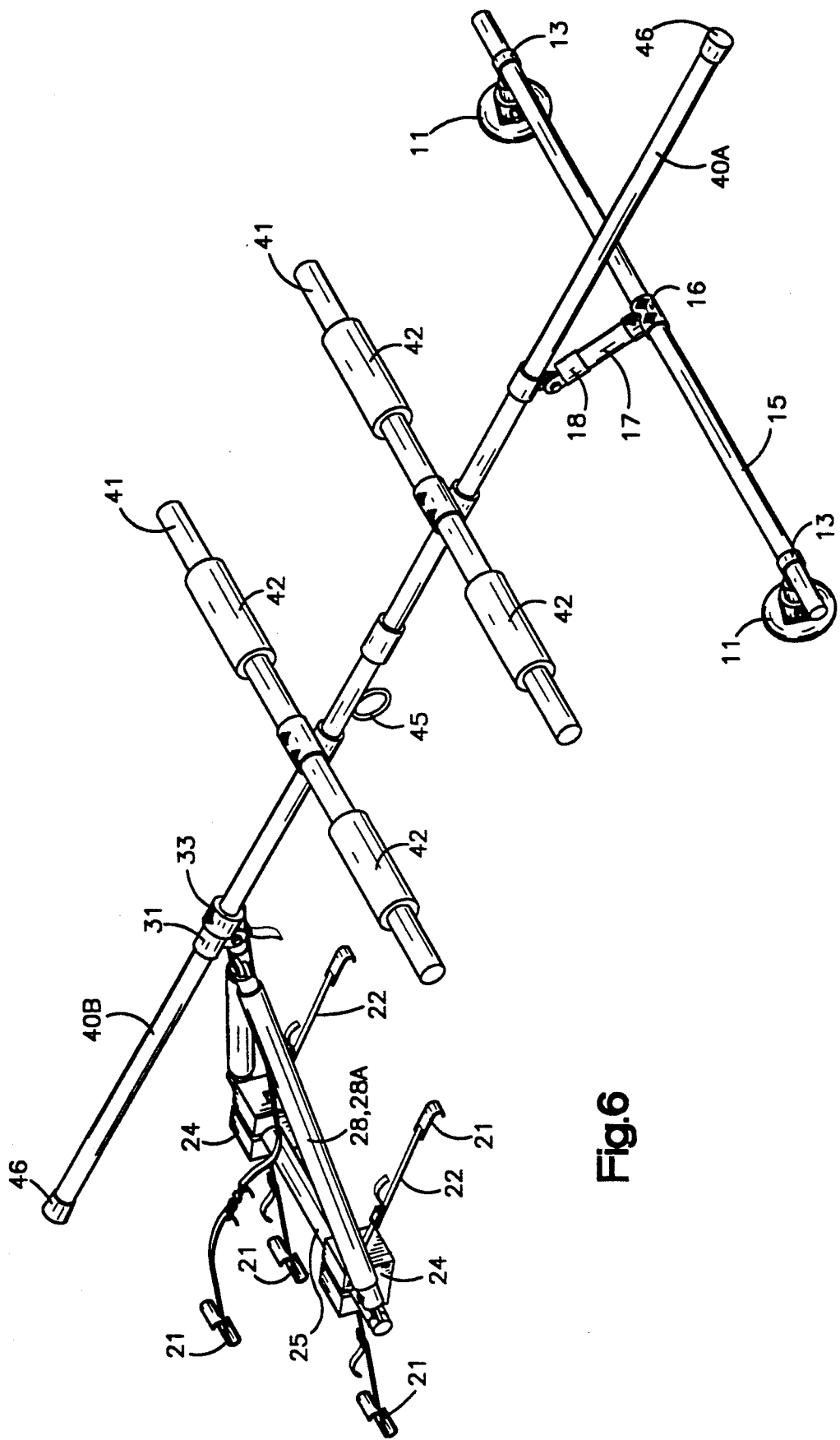
FIG. 6 is a perspective view of the rack of FIG. 1.

FIG. 6 and FIG. 7 depict, in greater detail, the preferred embodiments for the entire rack, specifically the longitudinal assembly. Aluminum bars 41 are attached to bars 40A and 40B by aluminum crossover fittings 43. The bars 41 may be covered with spongy material 42. Bars 40A and 40B are connected to form one elongated member 40 by the aluminum coupling 44. Steel eye-bolt 45 which can be used to anchor an object placed on the rack of the instant invention has been placed through and welded onto bar 40B. The aluminum bars, such as 40, may be capped with rubber end caps 46.

Accordingly, the reader can see that this invention can be used to carry sailboards, bicycles, surf boards, skis, and the like on virtually any convertible top vehicle, regardless of whether the convertible top is "up" or "down," without prohibiting the use of normal car functions, such as opening and closing the car's windows, doors, and convertible top.

While the above description contains many specifics, these should not be construed as limitations on the scope of the invention, but rather as an exemplification of one preferred embodiment thereof. Many other variations are possible. For examples, (1) a ball-end mechanism inserted into a permanent socket mounted to the windshield (or surrounding supports or parts of the vehicle's body) or other permanent device may be preferable to vacuum cups in certain instances, (2) different materials for the various components could easily be substituted for the materials described, and (3) many modifications could be made to the design of the connection mechanisms. Additionally, various modifications can be made to adapt the rack for carrying specific items. Numerous other changes will readily occur to those skilled in the art. Accordingly, the scope of the invention should be determined not by the embodiment illustrated, but by the appended claims and their legal equivalents.

I claim:

1. An overhead rack for transporting equipment on a convertible top, hard top, or no top vehicle, comprising:
   (a) front support means attachable to the front of a vehicle comprising a spreader bar perpendicular to the direction of the vehicle, wherein said spreader bar is attached to the front of said vehicle by anchoring means;
   (b) a front connection means attached to said spreader bar extending from said spreader bar to a longitudinal assembly;
   (c) a rear support means attachable to the rear of the vehicle comprising a base extending perpendicular to the direction of the vehicle wherein said base is attached to the rear of the vehicle by second anchoring means; wherein said second anchoring means includes straps anchoring the base, and clips attached to said straps and anchored around a hinge edge and an open edge of a trunk lid of said vehicle;
   (d) an upright support means extending from said base to said longitudinal assembly;
   (e) said longitudinal assembly connected to the front support means by said front connections means and to said rear support means by said upright support means; and
   (f) equipment support means attached to said longitudinal assembly whereby said equipment support means can be used to support equipment.

2. The rack as claimed in claim 1 wherein said anchoring means comprises at least one vacuum cup attached to said spreader bar.

3. The rack as claimed in claim 1 wherein said upright support means includes two upright bars of approximately equal length anchored near ends of said base and angled inwardly and upwardly to a common point thereby forming a triangle with the base.

4. The rack as claimed in claim 1 wherein said longitudinal assembly includes two rigid longitudinal bars placed end to end; and means for securing said rigid longitudinal bars to each other.

5. The rack as claimed in claim 1 wherein said equipment support means includes at least one transverse equipment support bar and attachment means for securing said at least one equipment support bar to the longitudinal assembly.

* * * * *